United States Patent [19]

Raimondi et al.

[11] 4,071,254
[45] Jan. 31, 1978

[54] STATIC SEALING MECHANISM FOR A COMPRESSOR

[75] Inventors: Albert A. Raimondi; Howard N. Kaufman, both of Monroeville, Pa.; Norman J. Wood, San Jose, Calif.

[73] Assignee: Westinghouse Electric Corporation, Pittsburgh, Pa.

[21] Appl. No.: 736,803

[22] Filed: Oct. 29, 1976

[51] Int. Cl.² ............................................. F16J 15/34
[52] U.S. Cl. ........................................... 277/3; 277/27; 277/74; 277/134
[58] Field of Search .................... 277/3, 27, 15, 74, 75, 277/77, 134

[56] References Cited

U.S. PATENT DOCUMENTS

| 3,051,497 | 8/1962 | Wigg et al. | 277/74 X |
| 3,062,554 | 11/1962 | McGahan et al. | 277/3 |
| 3,093,382 | 6/1963 | Macks | 277/27 |
| 3,410,565 | 11/1968 | Williams | 277/3 |
| 3,511,510 | 5/1970 | Lindeboom | 277/74 X |
| 3,622,164 | 11/1971 | Herbert et al. | 277/134 X |
| 3,679,217 | 7/1972 | Lesiecki | 277/3 |
| 3,759,532 | 9/1973 | Lindeboom | 277/74 X |
| 3,926,442 | 12/1975 | Muller | 277/27 X |
| 3,937,477 | 2/1976 | Gyory | 277/134 X |
| 3,963,247 | 6/1976 | Nommensen | 277/134 X |

FOREIGN PATENT DOCUMENTS 1,012,085 12/1965 United Kingdom ................... 277/27

Primary Examiner—Robert S. Ward, Jr.
Attorney, Agent, or Firm—J. W. Keen

[57] ABSTRACT

A system preventing fluid leakage from the inside of a compressor to the atmosphere. Static sealing of a non-rotating compressor shaft is provided by a multi-faced piston axially contacting a sleeve which is attached to and surrounds the shaft. The multi-faced piston is slidably actuated to the open, unsealed position during shaft rotation and to the closed, sealed position during non-rotation of the shaft by a series of conduits and valves which direct the fluid against an appropriate face of the piston.

7 Claims, 3 Drawing Figures

STATIC SEALING MECHANISM FOR A COMPRESSOR

BACKGROUND OF THE INVENTION

1. Field of the Invention

This invention relates to means for preventing fluid leakage from a compressor casing's shaft opening and more particularly to a sealing mechanism which utilizes a static seal piston to trap the fluid in the compressor casing while the compressor's dynamic sealing mechanism is inoperative.

2. Description of the Prior Art

In axial compressors the rotor shaft ends must be brought out of a fluid-tight enclosure or casing, necessitating the use of some means to prevent escape of compressed fluid from the casing along the shaft to the atmosphere. When the compressed fluid is natural gas, it is necessary to prevent leakage from the compressor to the atmosphere because of the high cost of natural gas to prevent ingress of air into the casing because an air-natural gas mixture is highly combustible. Ring seals and rubbing seals have often been used to trap the compressed fluids in casings, but were judged not to be entirely satisfactory for all modes of operation of nautral gas compressors.

The ring seal utilizes a set of annular plates which surround the shaft and are supplied with oil under pressure. The oil is distributed around the shaft by the annular plates with some oil forced both ways along the shaft through a small clearance between the plates and shaft, thus preventing escape of compressed fluid from the casing. The ring seal containment method functions satisfactorily if the oil supplied to the ring seals is maintained at a higher pressure than the compressed fluid pressure in the casing. The ring seal was also commonly used during non-rotation of the shaft, but that required continuous seal oil pump operation when the compressor was not functioning.

The rubbing seal method for preventing leakage has been extensively used for both the static and dynamic sealing modes. The rubbing seal method utilizes a material such as graphite which is held in contact with the shaft or a collar attached thereto. The interface between the sealing material and collar requires lubrication to prevent excessive heat generation, material failure, and rapid depletion of the sealing material. Even with lubrication, the rubbing seal requires frequent and periodic replacement. The rubbing seal method has historically been used primarily in applications having relatively small shafts.

When compressor speed is reduced below the normal 3600 revolutions per minute in a closed loop refrigeration system utilizing natural gas as the refrigerant, the pressure within the compressor can increase from the standard 68 psig to 480 psig due to the change in phase from liquid to gas of a large portion of the natural gas in the refrigeration loop. Since the ring seal method requires the seal fluid pump to provide a higher discharge pressure than that of the natural gas, the seal fluid pump would consume a great deal of power when the compressor was not in the normal mode of operation. Another factor which makes the ring seal method unattractive for compressor shut-down is the enormous volume of sealing fluid required for a large, 155,000 horsepower compressor shaft. The large shaft size and accompanying surface interface speeds also eliminate the rubbing seal method from consideration because of the high wear rate and degree of leakage along the shaft.

SUMMARY OF THE INVENTION

In accordance with the present invention, a sealing system is provided for retaining compressed fluid within an axial flow compressor by preventing leakge around the compressor shaft for the operating and stationary modes of the compressor shaft. The invention generally comprises a dynamic sealing apparatus, a sleeve which is attached to and surrounds a selected length of the shaft, a multi-faced static seal piston which surrounds a predetermined length of the shaft and provides a mechanical seal against compressed fluid leakage from the compressor casing by sliding axially into contact with the sleeve when the dynamic sealing apparatus is inoperative, and a valved conduit connecting the compressed fluid and a face of the static seal piston.

The static seal piston slides axially into contact with the sleeve when the valve on the valved conduit is closed and the dynamic sealing apparatus is removed from service, thus providing an effective seal without consuming power to maintain that seal. If the dynamic sealing apparatus fails, the static seal piston will automatically seat against the sleeve whether the valve is open or closed. Furthermore, the static seal piston presses against the sleeve with increased force as the compressed fluid pressure increases.

BRIEF DESCRIPTION OF THE DRAWINGS

For a better understanding of the invention, reference may be had to the preferred embodiment, exemplary of the invention, shown in the accompanying drawings in which.

DESCRIPTION OF THE PREFERRED EMBODIMENT

Figures 1, 2, 3:
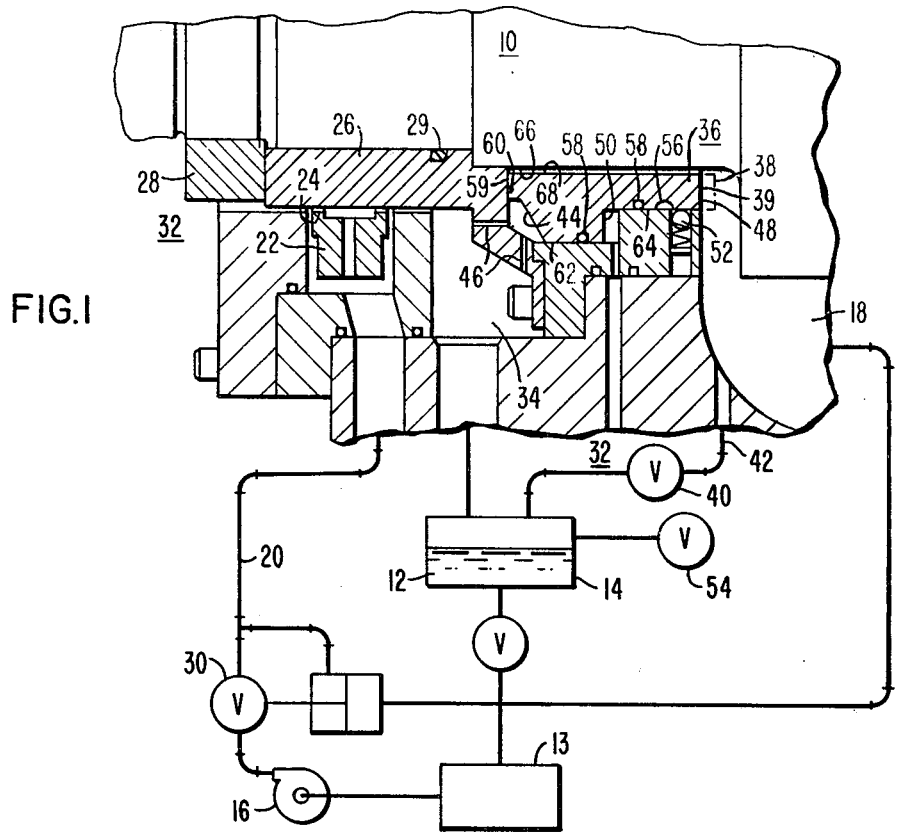
FIG. 1 is a partial section view of a sealing mechanism surrounding a compressor shaft where the shaft extends through a compressor casing.
FIG. 2 is an elevation view of a static seal piston.
FIG. 3 is a sectioned view of the static seal piston taken 90° from FIG. 2.

Referring now to the drawings in detail, FIG. 1 shows a partial sectioned view of an axial compressor whose rotatable shaft 10 is supplied with a sealing fluid or oil 12 which is drawn from a reservoir 13 after it has drained there from a high-pressure trap 14 or other separating means for segregating fluids of different densities, and is then discharged by pump 16 at a pressure greater than that of the compressed or sealed fluid 18. The sealing fluid 12, flows through line 20, and is distributed during shaft 10 rotation by ring seal 22 into clearance 24, which is between the ring seal 22 and a sleeve 26. Sleeve 16 surrounds shaft 10 and is held in place by locking nut 28 secured to shaft 10. Sleeve 26 is sealed to shaft 10 by a sealing member 29 or, for example, an O-ring. A pressure-regulating valve 30 maintains the pressure of sealing fluid 12 at a predetermined amount higher than the pressure of the sealed fluid 18, thus causing a portion of the sealing fluid 12 which is supplied to ring seal 22 to flow toward compressor drain cavity 34. The remaining portion of sealing fluid 12 supplied to ring seal 22 flows toward atmosphere 32 and then to reservoir 13. The sealing fluid 12 which flows toward compressor drain cavity 34 runs into the high-pressure trap 14.

When rotation of shaft 10 is initiated, static seal piston 36 slides to an open, unsealing position 38 from a closed, sealing position 39 by opening valve 40 and allowing sealed fluid 18 to flow through line 42 exerting pressure on face 44 of static seal pistion 36 through openings 46. Sealed fluid 18 cannot escape through clearance 24 while ring seal 22 is operating. Since face 44 when viewed along arrow 45 as shown in FIG. 3 has a projected area 44A which is larger than the opposing area of face 48, an unbalanced force drives the static seal piston 36 to the open, unsealing position 38. Face 50 of static seal piston 36 remains in contact with atmosphere 32 providing a differential area between axially opposite ends of static seal piston 36 so sealed fluid can exert unbalanced forces thereon. Ball detents 52 provide a locking action on static seal piston 36 after it has moved to the open, unsealed position 38. The static seal piston 36 will operate satisfactorily without the ball detents allowing them to be added as an option, if desired.

When rotation of shaft 10 ceases, sealing fluid 12 is no longer supplied to ring seal 22, and valve 40 is closed allowing the sealed fluid 18 to escape from drain cavity 34 to the atmosphere 32 through clearance 24. With atmospheric pressure exerted on faces 44 and 50 and with a greater gas pressure exerted on face 48, the locking force from the ball detents 52 is overcome and static seal piston 36 is driven to the closed, sealed position 39 in contact with sleeve 26. Valve 54 supplies supplementary venting to atmosphere 32 when opened after valve 40 has been closed.

The static seal piston 36, illustrated in FIGS. 2 and 3, has indentations 56 which accept a portion of each ball from the ball detents 52 and provide a locking action on piston 36 in the open, unsealed position 38. Fluid flow between faces 44, 50 and 48 is prevented by sealing members 58 or, O-rings, for example. Attached to piston face 59 is a deformable member 60 which provides sealed fluid retention in the axial compressor when static seal piston 36 forces the deformable member of elastomer, by example, axially into fluid-tight contact with sleeve 26.

If the pressure of sealed fluid 18 equals Pg, if atmospheric pressure equals Pa, if the area of face 48 equals $A_1$, if the area of face 50 equals $A_2$, if the projected area 44A of the face 44 equals $A_3$, and if the area of face 59 equals $A_4$, then the following equations must be satisfied for static seal piston 36 to function in this configuration:

For opening to position 38 $PgA_3 > PaA_2 + PgA_1 +$ friction at surfaces 62 and 64;

For closing to position 39 $PgA_1 + PaA_2 > Pa(A_3 + A_4) +$ detent locking forces + friction at surfaces 62 and 64.

The static seal piston 36 moves between the open position 38 and the closed position 39 by sliding axially on outside diameter faces 62 and 64. To minimize and throttle fluid 18 flow through annular space 66 between shaft 10 and static seal piston inside diameter 68, labyrinth windback 70 or thread, by example, is cut on the inside diameter 68. During shaft 10 rotation, the labyrinth windback 70 acts with the shaft and provides a "pumping" action which prevents seal fluid 12 from ingressing to the compressor interior and contaminating sealed fluid 18. The sealing capability of static seal piston 36 is further enhanced as the pressure of sealed fluid 18 increases and drives elastomer 60 against sleeve 26 with greater force.

We claim:

1. A machine containing a sealed fluid comprising:
   a non-rotatable, fluid-tight casing which envelops said sealed fluid;
   a rotatable shaft extending through said casing;
   a dynamic sealing means for preventing sealed fluid leakage from the casing along said shaft through a clearance between said shaft and said casing during shaft rotation, said dynamic sealing means having an operative sealing capability which is selectively actuatable and is independent of shaft rotation;
   a static sealing apparatus including an axially displaceable member which is selectively displaceable across said clearance into and out of contact with a seating member, said seating member being rotatable with and extending substantially radially from said shaft; and
   controlling means for displacing said displaceable member by providing selected fluid pressures to a portion of the clearance, said portion being defined by said dynamic sealing means and said displaceable member, said pressures being selected to interact with an opposing force to move said displaceable member between positions where it is separated from and where it is in contact with said seating member, the fluid providing the separating pressure comprising said sealed fluid.

2. The machine of claim 1, said displaceable member comprising:
   a piston disposed around a predetermined length of said shaft with an annular space therebetween, said piston having a plurality of faces extending substantially radial in relation to the shaft's axis of rotation, a first and second of said faces being arranged to be in contact with said sealed fluid during operation of said dynamic sealing means and a third of said faces being situated to be in contact with said sealed fluid at all times, said second face being exposable to said selected fluid pressure during contact between said piston and seating member, wherein said second and third faces are disposed on axially opposite ends of said piston.

3. The machine of claim 2, said controlling means comprising:
   a first valving means for regulating fluid communication between a high pressure fluid source and said second face through said clearance portion wherein said dynamic sealing means prevents fluid communication through said clearance portion between said second face and a low pressure fluid source while operating and permits fluid communication through said clearance portion between said second face and said low pressure fluid source while not operating.

4. The machine of claim 1, said seating member comprising: a sleeve.

5. The machine of claim 2, further comprising:
   a locking means for securing said piston in said separated position.

6. The machine of claim 2, further comprising:
   a deformable member attached to said first face wherein said deformable member deforms on contact with said seating member providing a fluid-tight seal between said first face and said seating member.

7. The machine of claim 2, said piston comprising:
   a labyrinth wind-back formed on said piston surface surrounding said shaft wherein said labyrinth wind-back throttles said sealed fluid flow through said annular space and prevents seal fluid flow therethrough.

* * * * *